United States Patent
Tkacik

(10) Patent No.: US 8,379,846 B2
(45) Date of Patent: Feb. 19, 2013

(54) ENCRYPTION APPARATUS AND METHOD THEREFOR

(75) Inventor: Thomas E. Tkacik, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 832 days.

(21) Appl. No.: 12/469,868

(22) Filed: May 21, 2009

(65) Prior Publication Data

US 2010/0296651 A1    Nov. 25, 2010

(51) Int. Cl.
H04L 9/00       (2006.01)
(52) U.S. Cl. ......................................... 380/44
(58) Field of Classification Search ........... 380/44
See application file for complete search history.

(56) References Cited

U.S. PATENT DOCUMENTS

| | | | |
|---|---|---|---|
| 7,103,782 B1 | 9/2006 | Tugenberg et al. | |
| 7,500,098 B2 | 3/2009 | Paatero | |
| 2005/0005156 A1* | 1/2005 | Harper | 713/200 |
| 2006/0020941 A1 | 1/2006 | Inamura et al. | |
| 2006/0026417 A1 | 2/2006 | Furusawa | |
| 2007/0297606 A1 | 12/2007 | Tkacik et al. | |
| 2012/0017097 A1* | 1/2012 | Walrath | 713/190 |

FOREIGN PATENT DOCUMENTS

WO    2004038995 A1    5/2004

OTHER PUBLICATIONS

Dallas Semiconductor Maxim, Authentication & Data Security: Silicon Solutions Safeguard Secret Data, Protect Intellectual Property, and Authenticate Hardware © 2006 pages (7).

* cited by examiner

*Primary Examiner* — Philip Lee
(74) *Attorney, Agent, or Firm* — Schmeiser, Olsen & Watts LLP; Charlene R. Jacobsen; Lowell W. Gresham

(57) ABSTRACT

An encryption apparatus (14) includes an integrated circuit (34) having a secure processing section (30). A plaintext reset epoch key (154) is stored in the secure processing section (30) and configured to have a short life. A plaintext master key (160) is stored in the secure processing section (30) and configured to have a long life. A multiplicity of active keys (172) are generated, encrypted using a weaker but faster cryptographic algorithm (68) and the reset epoch key (154), then stored in a high-capacity key magazine (86) portion of unsecured memory (16, 18, 28). Some keys and data are also encrypted using a stronger but slower cryptographic algorithm (70) and the master key (160), then stored in unsecured memory (16, 18, 28). Keys (272, 372) may be converted between weaker, faster encryption and stronger, slower encryption.

19 Claims, 5 Drawing Sheets

ENCRYPTION APPARATUS AND METHOD THEREFOR

TECHNICAL FIELD OF THE INVENTION

The present invention generally relates to data security in electronic computing devices. More specifically, the present invention relates to the use of long-lived and short-lived keys to maintain data security while achieving capacity and performance improvements.

BACKGROUND OF THE INVENTION

Computing devices achieve data security in part by performing a variety of cryptographic operations on data objects. Cryptographic operations typically use an encryption key, which may be either a secret key for a symmetric cryptographic operation or a public key for an asymmetric cryptographic operation. In order for a symmetric cryptographic operation to maintain security, the secret key should be kept secret.

A variety of algorithmic and non-algorithmic techniques may be used to insure the privacy of the secret key. Algorithmic techniques employ mathematical operations to transform a secret plaintext key into a ciphertext key. The ciphertext key may then be publicized without revealing the secret key from which it is formed. Commonly used cryptographic algorithms include: AES, DES, Triple DES, Blowfish, Serpent Twofish, and numerous others.

Non-algorithmic techniques employ design, physical features, architecture, operational rules, and the like to keep the likelihood that a secret key will be discovered as low as possible. Thus, restricting human or electronic access to a device which has a secret key reduces the likelihood of the secret key being discovered. Likewise, a system which keeps a secret key for only a short time has stronger security than one which attempts to maintain the secrecy of a key for a long time. And, a system which reuses a secret key to encrypt different data objects less often has stronger security than one which reuses the secret key more often.

Non-algorithmic techniques are also conventionally used to promote trust in the algorithmic techniques. Devices concerned with data security may use a secure processing device, such as a secure microprocessor or the like, which includes physical and logical features to provide a secure execution environment (SEE). The SEE, also called a trusted platform, security zone, and the like, may include software and/or hardware features which promote a high level of trust in the cryptographic operations the device may undertake, making the security features of the device nearly immune to malicious software that the device may accidentally or intentionally execute from time to time.

One feature conventionally included in a SEE is a permanent, or at least long-lived, secret key. The long-lived secret key desirably survives power cycling and resets, and is inaccessible to malicious software. Often, this long-lived key is cryptographically unique to the device in which it is stored. Thus, by using this long-lived key, data and software may be bound to the specific device where the data and software reside.

A conventional SEE also includes a random number generator for generating new keys when desired for use in cryptographic operations. In order to promote data security, many independent secret keys are desirably used for cryptographic operations on many different data objects rather than reusing a smaller number of secret keys. While the data objects may be publicized after encryption, the secret keys should be saved for subsequent decryption operations, and they should be kept secret. One conventional way to maintain the privacy is to save the keys in a secure memory device under the control of a SEE. Another conventional way is to encrypt them using the long-lived secret key for storage in unsecured memory, then retrieve them to the SEE and decrypt them when needed.

Both of these conventional approaches to managing secret keys pose problems. Memory under the control of a SEE is usually at a premium because it becomes more costly and difficult to maintain trust over larger amounts of memory. Thus, when device applications require the use of a high capacity key magazine capable of holding a vast number of independent secret keys, an insufficient amount of such memory will be available. Such device applications include secure high-capacity routers and servers capable of simultaneously supporting a vast number of communication sessions or other data object domains for a vast number of clients. Likewise, when device applications need scalability to support both a low-capacity key magazine and a high-capacity key magazine, reliance upon memory under the control of a SEE for storing secret keys limits such scalability.

But using a long-lived secret key to encrypt a data object, whether the object is payload data or a secret payload key used to encrypt the payload data, poses its own security concerns. The long-lived nature of this secret key poses non-algorithmic security risks. Its repeated use is desirably minimized. And, to compensate for the non-algorithmic security concerns associated with managing a long-lived secret key, it is desirably used only in connection with cryptographically strong algorithms. Stronger encryption algorithms are characterized by including tags and other features that insure authentication and integrity in addition to privacy or confidentiality. But stronger cryptographic algorithms typically require more processing time than weaker cryptographic algorithms. Accordingly, when a device repeatedly uses a long-lived secret key to encrypt and decrypt a vast number of payload keys, performance suffers from the use of stronger cryptographic algorithms and security suffers from repeated use of long-lived keys.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION

An encryption apparatus which is compatible with the use of a high-capacity key magazine is needed. And, a need exists for an encryption apparatus that permits a vast number of encrypted secret keys to be safely stored in unsecured memory and then decrypted in a high performance manner.

Figure 1:
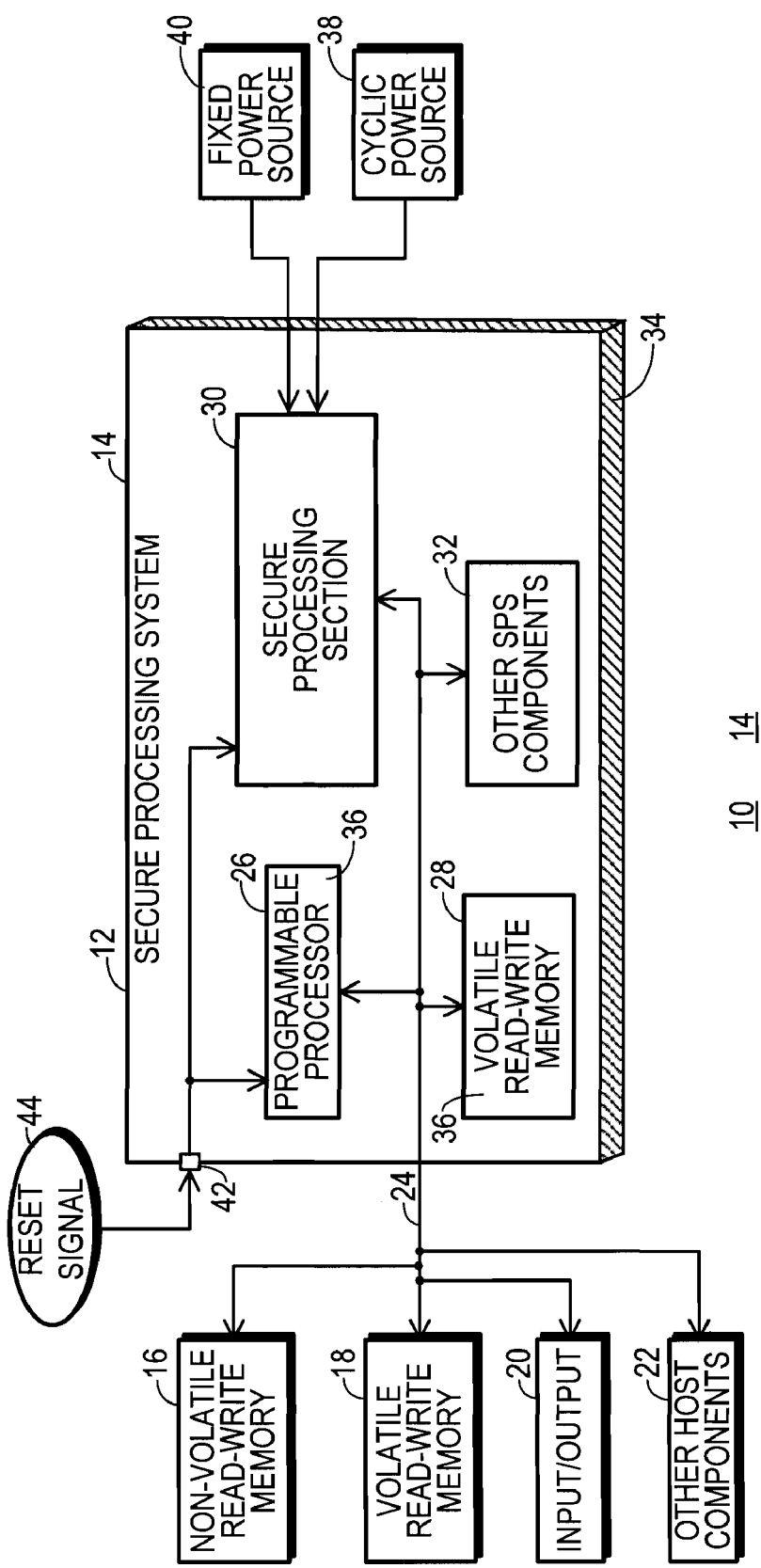
FIG. 1 shows a block diagram of a host device that utilizes a secure processing system.

FIG. 1 shows a block diagram of a host device 10 that utilizes a secure processing system 12. Secure processing system 12 is an encryption apparatus 14 because it performs data encryption and/or decryption operations. Likewise host device 10 is an encryption apparatus 14 because it performs data encryption and/or decryption operations.

Encryption apparatus 14 in the form of host device 10 represents an electronic device that includes provisions for maintaining the security of data that may be stored in, processed by, and/or communicated by host device 10. Host device 10 may be configured for any of a wide variety of different data-processing applications, including server, point-of-sale terminal, wireline or wireless telephony, radio, personal computer, laptop, handheld computer, workstation, digital media player, router, modem, industrial controller, and the like.

As depicted in FIG. 1, in addition to secure processing system 12, host device 10 may include a non-volatile read-write memory 16, a volatile read-write memory 18, an input/output section 20, and other host components 22 of a type and configuration understood to those skilled in the art of data processing and computerized devices. Memory 16, memory 18, section 20, and other components 22 couple together and to secure processing system 12 through a bus 24 that conveys data, addresses, and control signals.

Among other things, encryption apparatus 14 in the form of secure processing system 12 provides data security services, including the encryption and decryption of data, for host device 10. In the embodiment depicted in FIG. 1, secure processing system 12 provides other data processing services as well. For example, secure processing system 12 includes a programmable processor 26, which may be viewed as a central processing unit (CPU), processor, controller, microcontroller, microprocessor, or the like. Programmable processor 26 may, but is not required to, be the only programmable processor for host device 10.

A programmable processor, such as programmable processor 26, differs from an unprogrammable processor in that the software, programming instructions, or code it executes may be changed or augmented in some way after host device 10 has been manufactured. Security considerations for host device 10 are evaluated under the assumption that a programmable processor, such as programmable processor 26, may be vulnerable to malicious code, such as software viruses, trojans, worms, software bugs, and the like. Desirably, host device 10 is configured to minimize the likelihood of malicious code being executed on programmable processor 26, but no requirement exists for guaranteeing that programmable processor 26 is absolutely prevented from executing malicious code.

Programmable processor 26 couples to bus 24 as does a volatile read-write memory 28, a secure processing section 30, and other secure processing system (SPS) components 32. Desirably, processor 26, memory 28, secure processing section 30, and other SPS components 32 are all formed together on a common semiconductor substrate and are packaged together and reside within a single integrated circuit 34.

Secure processing section 30 provides a secure execution environment (SEE) for secure processing system 12 and host device 10. Read-write memories 16, 18, and 28 are unsecured memories because they are all located outside of secure processing section 30. In contrast, memory located within secure processing section 30 (discussed below) is secured memory. In large part, secure processing system 12 provides security services through the operation of secure processing section 30, including cryptographic operations which use keys stored in unsecured memory 16, 18 and/or 28 located outside of section 30. These cryptographic operations which rely upon keys stored in unsecured memory 16, 18, and/or 28 are discussed below in more detail in connection with FIGS. 2-8. Among unsecured memories 16, 18, and 28, on-chip memory 28 is the more secure due to a greater degree of difficulty faced in discovering its contents. But off-chip memories 16 and 18, and particularly volatile read-write memory 18, are nevertheless useful in connection with cryptographic operations even though they reside outside integrated circuit 34.

In particular, volatile read-write memory 18 may be configured as high performance memory, and a large quantity of volatile read-write memory 18 may be provided in host device 10 at low cost. Moreover, the amount of memory 18 included in host device 10 may be easily increased at little cost during the lifetime of device 10 to accommodate the scalability of host device 10.

Volatile read-write memory 18 is a desirable place to store a high-capacity magazine of cryptographic keys (discussed below) for use in connection with cryptographic operations taking place in host device 10. As discussed in more detail below, such cryptographic keys are stored in unsecured memories 16, 18, and/or 28 in a ciphertext form under the assumption that the contents of memories 16, 18, and/or 28 will somehow be illicitly published, read by, or copied to other devices during the lifetime of host device 10.

Sensitive data for which security services are provided should generally be protected from unauthorized disclosures and/or bound to use only on or with a particular host device 10 where the sensitive data reside. Accordingly, host device 10 desirably implements a secret key, or symmetric key, cryptographic system. In particular, host device 10 may encrypt plaintext data into ciphertext data within secure processing system 12, and then transfer the ciphertext data outside of secure processing system 12, such as to non-volatile memory 16 or input/output section 20.

The movement of ciphertext data into and out of secure processing system 12 and other activities performed by secure processing system 12 may be controlled by programmable processor 26, as defined by programming code 36. Programming code 36 is executed by programmable processor 26 and may be stored in any one or more of memories 16, 18, 28 and/or other SPS components 32, or programming code 36 may be considered to be a part of programmable processor 26.

While host device 10 desirably implements a symmetric key cryptographic system, nothing prevents host device 10 from also being configured to implement an asymmetric key cryptographic system.

FIG. 1 depicts the use of two different power sources. Both a cyclic power source 38 and a fixed power source 40 couple to secure processing system 12, and particularly to secure processing section 30 of secure processing system 12 in the embodiment depicted in FIG. 1. Cyclic power source 38 is intended to provide the primary power for host device 10 and secure processing system 12. Cyclic power source 38 may be turned off so as to supply no voltage when host device 10 is not being used, and then turned back on when host device 10 is to be used. Cyclic power source 38 may be provided by a switched battery, by a power supply that draws energy from a public power distribution network or in any other way known to those skilled in the art. Fixed power source 40 may be provided by a battery that is hard wired or otherwise configured to supply a fixed voltage that is not removed through the operational life of host device 10. In other words, fixed power source 40 is not intended to be turned off and on. A Li-ion button battery may suffice for fixed power source 40.

Secure processing system 12 includes a reset port 42 at which a reset signal 44 is applied and coupled to programmable processor 26 and secure processing section 30. Resets occur when reset signal 44 is activated. Reset signal 44 may be activated immediately after host device 10 powers on, in response to a human or mechanical manipulation of a reset switch (not shown), in response to software events, and in other situations. Any number of resets may occur during the lifetime of host device 10. But resets are desirably unusual occurrences for host device 10, and host device 10 is desirably configured to operate for extended periods of time (e.g., weeks or months) without a reset having occurred.

Figure 2:
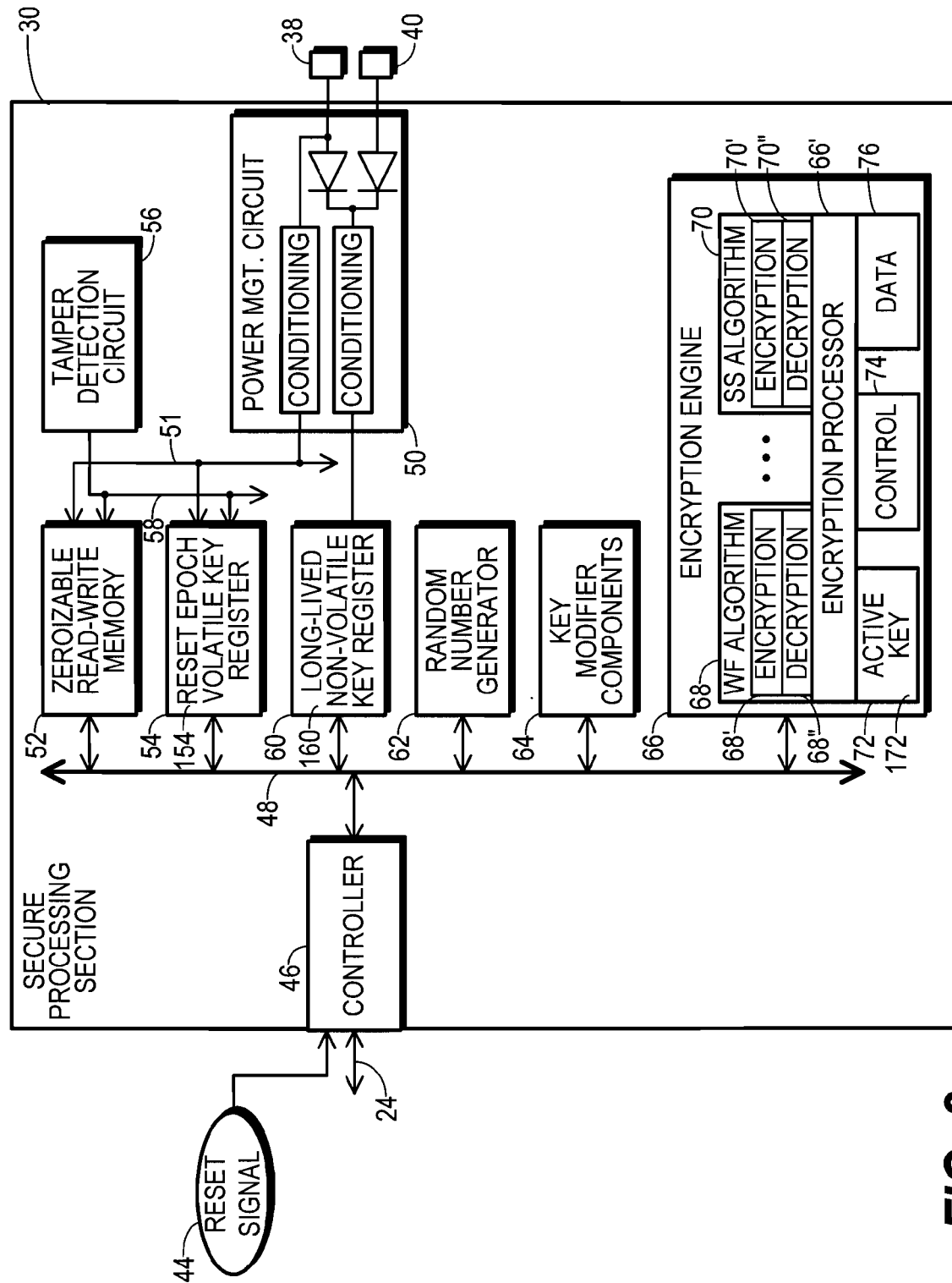
FIG. 2 shows a block diagram of a secure processing section of the secure processing system depicted in FIG. 1.

FIG. 2 shows a block diagram of secure processing section 30 from secure processing system 12. Secure processing section 30 operates under the control and management of a controller 46. FIG. 2 depicts controller 46 serving as an interface between the data, addresses, and signals of bus 24 outside of secure processing section 30 and the data, address, and signals of a data, address, and control signal bus 48 located within secure processing section 30. But controller 46 may be implemented in a wide variety of ways. In one embodiment, a separate programmable device, such as a microprocessor, serves as controller 46, and data passing into and out from secure processing section 30 physically passes through controller 46. In another embodiment, such data does not physically pass through controller 46, but controller 46 is configured to control whether data may pass into and out from secure processing section 30 as well as to control the movement of data and control signals within secure processing section 30. In another embodiment, controller 46 is distributed so as to have separate control functions associated with the various components of secure processing section 30 and to control the flow of data into and out from secure processing section 30. And, in another embodiment controller 46 may be implemented by programmable processor 26 (FIG. 1) operating in a secure or trusted mode. In this embodiment, controller 46 may represent a control register and trusted software programming code that control the flow of data into, out from, and within secure processing section 30 as well as the manner in which various operations are carried out within secure processing section 30. These and other forms of controller 46 may be used in connection with secure processing section 30.

FIG. 2 shows that reset signal 44 is applied to secure processing section 30 at controller 46 to indicate that the operation of secure processing section 30 in response to a reset is also managed by controller 46. In addition, FIG. 2 indicates that power inputs from cyclic power source 38 and fixed power source 40 are also applied to secure processing section 30 in one embodiment. One output from a power management circuit 50 supplies power from cyclic power source 38 to the majority of components of secure processing section 30. This power cycles off and on during the life cycle of host device 10 as cyclic power source 38 cycles off and on.

In particular, a cyclic power output 51 from power management circuit 50 couples at least to a zeroizable read-write memory 52 and to a key register 54. Data, address, and control signal bus 48 also couples to zeroizable read-write memory 52 and to key register 54.

Zeroizable read-write memory 52 provides secure memory for secure processing system 12 and host device 10 (FIG. 1) due to the trust provided by secure processing section 30. Its contents are protected against the execution of malicious software within host device 10. While any amount of memory may be provided as memory 52, in one embodiment only a limited quantity of memory is provided. And, this limited quantity may be inadequate for maintaining the privacy of a multiplicity of keys stored in a high-capacity key magazine in addition to other data storage and buffering tasks which may be asked of memory 52 in connection with moving blocks of payload data into and out from secure processing section 30 in support of cryptographic operations.

As is discussed in more detail below, key register 54 is used to store a plaintext reset epoch key 154 which has a limited lifetime and is preferably valid for no longer than the duration between resets. In one embodiment, reset epoch key register 54 is formed as a section of zeroizable read-write memory 52, but register 54 is shown as a separate register in FIG. 2 due to its function in retaining a secret plaintext cryptographic key, as is discussed in more detail below. Desirably, reset epoch key register 54 and zeroizable read-write memory 52 are configured as a volatile memory. Thus, data stored therein, including reset epoch key 154, are destroyed when power cycles off. Reset epoch key register 54 may store other keys as well as reset epoch key 154.

Secure processing section 30 also includes a tamper detection circuit 56. Tamper detection circuit 56 is configured to detect characteristics of the physical environment which suggest that secure processing system 12 might not be operating properly. One or more of such characteristics are likely to be experienced if a saboteur attempts to tamper with host device 10 in an effort to discover private security parameters that are stored therein. Examples of private security parameters include secret keys, such as plaintext reset epoch key 154 stored in reset epoch key register 54.

In one embodiment tamper detection circuit 56 includes a number of different sensors. The activation of any one of the sensors may cause a tamper signal 58 to activate. The sensors may include, for example, a temperature sensor, clock sensor, voltage sensor, and external sensors integrated into the design of a circuit card or housing on which or in which secure processing system 12 may be located or included within secure processing system 12 itself. Any of the tamper detection techniques and circuits known by those skilled in the art may be incorporated, in whole or in part, within tamper detection circuit 56.

Tamper signal 58 is routed, directly or indirectly, from an output of tamper detection circuit 56 at least to an input of zeroizable memory 52 and an input of reset epoch key register 54. In one embodiment, tamper signal 58 is configured to cause power to be removed from zeroizable memory 52 and reset epoch key register 54. In another embodiment, tamper signal 58 is configured to clear the contents of zeroizable memory 52 and reset epoch key register 54.

When a tamper event is detected by tamper detection circuit 56, tamper signal 58 activates. When tamper signal 58 activates, the contents of zeroizable memory 54 and of reset epoch register 54 are destroyed (e.g., zeroized). Thus, the contents of reset epoch key register 54 are destroyed in response to a tamper event or a power off event, causing the life of any reset epoch key 154 stored therein to end at either the tamper event or the power off event.

Other consequences may also ensue from activation of tamper signal 58. For example, processor 26 and any programming code 36 being executed thereby and/or controller 46 may be informed of the tamper event by a suitable mechanism, such as through an interrupt. Processor 26 and any programming code 36 being executed thereby and/or controller 46 desirably perform an appropriate error handling routine, such as sounding an alarm or displaying an appropriate message, in response to the tamper event.

Secure processing section 30 also includes a long-lived, non-volatile key register 60. Key register 60 couples to data, address and control signal bus 48. Key register 60 desirably stores one or more plaintext master keys 160. Since key register 60 is a non-volatile register, plaintext master key 160 has a life which extends across power cycles for host device 10 and does not end at a power off event. And, in a typical application, plaintext master key 160 is neither generated nor destroyed in response to resets. Hence, plaintext master key 160 is a long-lived key when compared to plaintext reset-epoch key 154 stored in reset epoch key register 54.

In one embodiment, long-lived key register 60 is configured as a non-volatile read-write register. Thus, power management circuit 50 may be configured so that the power for long-lived key register 60 is supplied by cyclic power source 38 when cyclic power source 38 is switched on and by fixed power source 40 when cyclic power source 38 is switched off. In other words, power management circuit 50 desirably causes fixed power source 40 to function as a battery backup with respect to long-lived key register 60. In this embodiment, power management circuit 50 causes long-lived key register 60 to operate as a non-volatile register because it remains powered up throughout the normal life cycle of host device 10. A plaintext master key 160 stored in long-lived key register 60 will not be erased but will be retained when cyclic power source 38 cycles off. Plaintext master key 160 is desirably generated in any cryptographically valid manner and stored in long-lived key register 60 at any time after the manufacture of host device 10. In a typical application, the generation of plaintext master key 160 is most likely a rare event, and may take place only once during the lifetime of host device 10. This embodiment of long-lived key register 60 may also include an input driven by tamper signal 58 (not shown) so that its contents are destroyed when a tamper event occurs.

In another embodiment, long-lived key register 60 is configured as a non-volatile, read-only register. In this embodiment, fixed power source 40 may be omitted, and long-lived key register 60 may be energized by cyclic power output 51, rather than as shown in FIG. 2. In this embodiment, long-lived key register 60 is desirably programmed with plaintext master key 160 during the manufacturing process of secure processing system 12 and cannot thereafter be altered. For example, laser-scribed fuses may be burned during the manufacture of integrated circuit 34 (FIG. 1) to permanently program plaintext master key 160 into long-lived key register 60. Alternatively, electronic fuses may be electronically burned to program plaintext master key 160 and then blocked against further programming.

Secure processing section 30 includes a random number generator 62 and a key modifier components section 64, each of which couples to data, address and control signal bus 48. Desirably, random number generator 62 is a hardware-implemented random number generator whose random number generation processes and/or algorithms cannot be altered after secure processing system 12 has been manufactured. Random number generator 62 generates random numbers when requested to do so by controller 46, and such random numbers may then be moved and stored in other components of secure processing section 30, or more generally host device 10, for subsequent use. Thus, controller 46 is desirably configured to cause plaintext reset epoch key 154 to be formed using random number generator 62 and stored in reset epoch register 54 in response to the activation of reset signal 44.

Key modifier components section 64 may include a control register and logic outputs that provide signals usefully combined with random numbers generated in random number generator 62 to generate cryptographic keys, such as the above-discussed reset-epoch key 154 and/or master key 160. For example, one form of modifier component may represent a user password that is combined with a random number in the generation of a key. Thus, keys generated for one user of host device 10 can differ from the keys generated for another user of host device 10, binding various data objects to specific users of host device 10. And, section 64 may provide bits to indicate whether secure processing system 12 has completed its self-testing and security initialization processes and is now prepared to provide security services, causing any cryptographic services attempted prior to such initialization processes to be unsuccessful. These and other key modifiers may be provided through modifier components section 64 so that cryptographic keys generated in secure processing section 30 may be derived from a variety of components rather than only a random number generated by random number generator 62.

Secure processing section 30 also includes an encryption engine 66 coupled to data, address, and control signal bus 48. In the preferred embodiment, encryption engine 66 provides encryption logic circuitry in the form of an encryption processor 66' capable of implementing a variety of symmetric cryptographic algorithms for the encryption of plaintext data into ciphertext data and for the decryption of the ciphertext data back into the plaintext data.

The cryptographic algorithms desirably include algorithms which cover a range in strength and in processing performance. Thus, the cryptographic algorithms include at least a weaker cryptographic algorithm 68 that has faster performance, labeled as "WF algorithm" in FIG. 2, and a stronger cryptographic algorithm 70 that has slower performance, labeled as "SS algorithm" in FIG. 2. WF algorithm 68 includes an encryption process 68' and a decryption process 68", while SS algorithm 70 includes an encryption process 70' and a decryption process 70". As discussed in more detail below, host device 10 may benefit from repeatedly performing decryption process 68". Accordingly, not only is algorithm 68 faster than algorithm 70, but decryption process 68" is desirably at least as fast as encryption process 68' to further improve performance. The terms "weaker", "faster", "stronger", and "slower" are used herein as relative terms, where the faster algorithm is faster than the slower algorithm and the stronger algorithm is cryptographically stronger than the weaker algorithm. The weaker algorithm need not be weak in an absolute sense, and as discussed below may in fact be quite strong when considered with non-algorithmic features of host device 10.

In one embodiment, WF algorithm 68 may implement the electronic codebook (ECB) mode of the Advanced Encryption Standard (AES), and SS algorithm 70 may implement the counter with CBC-MAC (CCM) AES mode. In this embodiment, a variety of techniques may be used to insure that the AES-ECB decryption process 68" is at least as fast as the AES-ECB encryption process 68'. Such techniques include encrypting and saving an initializing value from the encryption process for use in starting the decryption process, from running the standard decryption process as the encryption process and vice-versa, and the like. The ECB and CCM modes differ from each other in that the CCM mode provides stronger encryption which includes authentication and data integrity but is computationally more complex and takes more processing time to implement. An even stronger algorithm may be provided using a Key Wrap construction.

But encryption engine 66 may alternatively implement any of a wide variety of different AES, Data Encryption Standard (DES), triple Data Encryption Standard (3DES), Blowfish, and other cryptographic algorithms so long as a range in strength and performance is covered using at least two cryptographic algorithms. And, encryption engine 66 may also perform other cryptographic algorithms, such as hashing algorithms, which may not directly implement encryption or decryption processes but which are nevertheless useful in cryptography.

As indicated by ellipsis in FIG. 2, any number of cryptographic algorithms may be performed by encryption engine 66, including asymmetrical cryptographic algorithms. Desirably, these cryptographic algorithms, including WF algorithm 68 and SS algorithm 70, are implemented in a manner that makes them immune to malicious software. For example, they may be hard wired and/or performed in response to trusted firmware or software programming code that cannot be altered after the manufacture of secure processing system 12.

FIG. 2 shows that encryption processor 66' performs algorithms 68 and 70 using a plaintext active key 172 stored in an active key register 72, control data stored in a control register 74, and payload data stored in a data register 76. While FIG. 2 shows registers 72, 74, and 76 as being a part of encryption engine 66, they may also be included as a part of zeroizable memory 52 or located elsewhere in alternate embodiments. Likewise, registers 72, 74, and 76 may have an input driven by tamper signal 58 so that their contents are destroyed upon a tamper event. In general, the control data stored in control register 74 informs encryption engine 66 which algorithm and process to implement and which operational parameters, such as an initialization vector, to use in performing the algorithm.

The selected algorithm uses plaintext active key 172 stored in active key register 72 to perform the selected cryptographic algorithm on the payload data stored in data register 76. It is controller 46 that causes a particular plaintext active key 172 to be stored in active key register 72. Thus, for example, to perform a cryptographic operation on payload data, controller 46 may cause a ciphertext key to be obtained from unsecured memory 16, 18, or 28 (FIG. 1), decrypted as though it were payload data (using plaintext reset epoch key 154 or a key derived from reset epoch key 154) in encryption processor 66' to generate the plaintext active key 172, which is stored in active key register 72.

In accordance with symmetrical cryptographic principles, the same plaintext active key 172 that was used to encrypt plaintext data into ciphertext data is used at a later time to successfully decrypt the ciphertext data back into the plaintext data. Otherwise, a different plaintext active key 172 will cause the ciphertext data to decrypt unsuccessfully.

In the preferred embodiment, WF algorithm 68 is used with plaintext reset epoch key 154, or a key derived from reset epoch key 154, while SS algorithm 70 is used with plaintext master key 160, or a key derived from master key 160. Any lack of algorithmic strength associated with WF algorithm 68 is compensated for, at least in part, by the non-algorithmic, limited lifetime feature of plaintext reset epoch key 154. And, any lack of non-algorithmic strength associated with the permanence of the long-lived plaintext master key 160 is compensated for, at least in part, by the algorithmic strength of SS algorithm 70.

Figure 3:
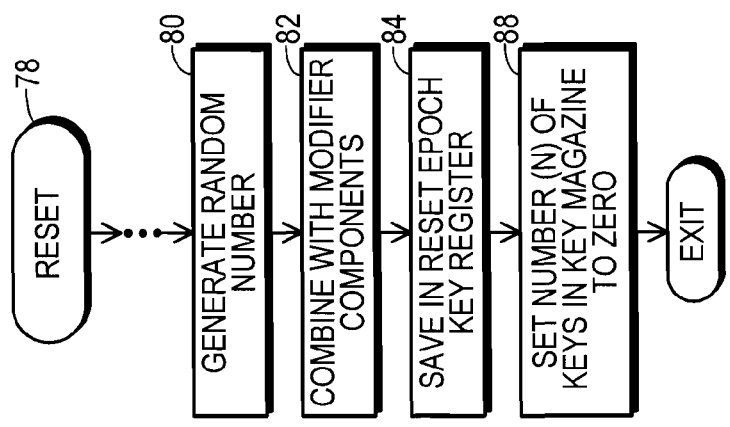
FIG. 3 shows an exemplary flow chart of a process performed in the secure processing section in response to a reset.

FIG. 3 shows an exemplary flow chart of a process 78 performed by secure processing system 12, and particularly by secure processing section 30, in response to a reset. Reset process 78 may be performed by controller 46 in response to the execution of software programming instructions using components of secure processing section 30, and possibly other components of host device 10.

As indicated by ellipsis in FIG. 3, and with continued reference to FIG. 2, reset process 78 may include any number of tasks conventionally carried out in computing equipment in response to a reset. Eventually, reset process 78 performs a task 80 in which a random number is generated using random number generator 62. Then, in one embodiment the random number generated in task 80 is combined with key modifier components from section 64 in a task 82, and possibly arithmetically manipulated further by hashing or the like, to form a suitable plaintext reset epoch key 154. In another embodiment, the random number generated in task 80 more directly serves as plaintext reset epoch key 154 without performing task 82. Then, plaintext reset epoch key 154 is stored in reset epoch key register 54 in a task 84.

Figure 4:
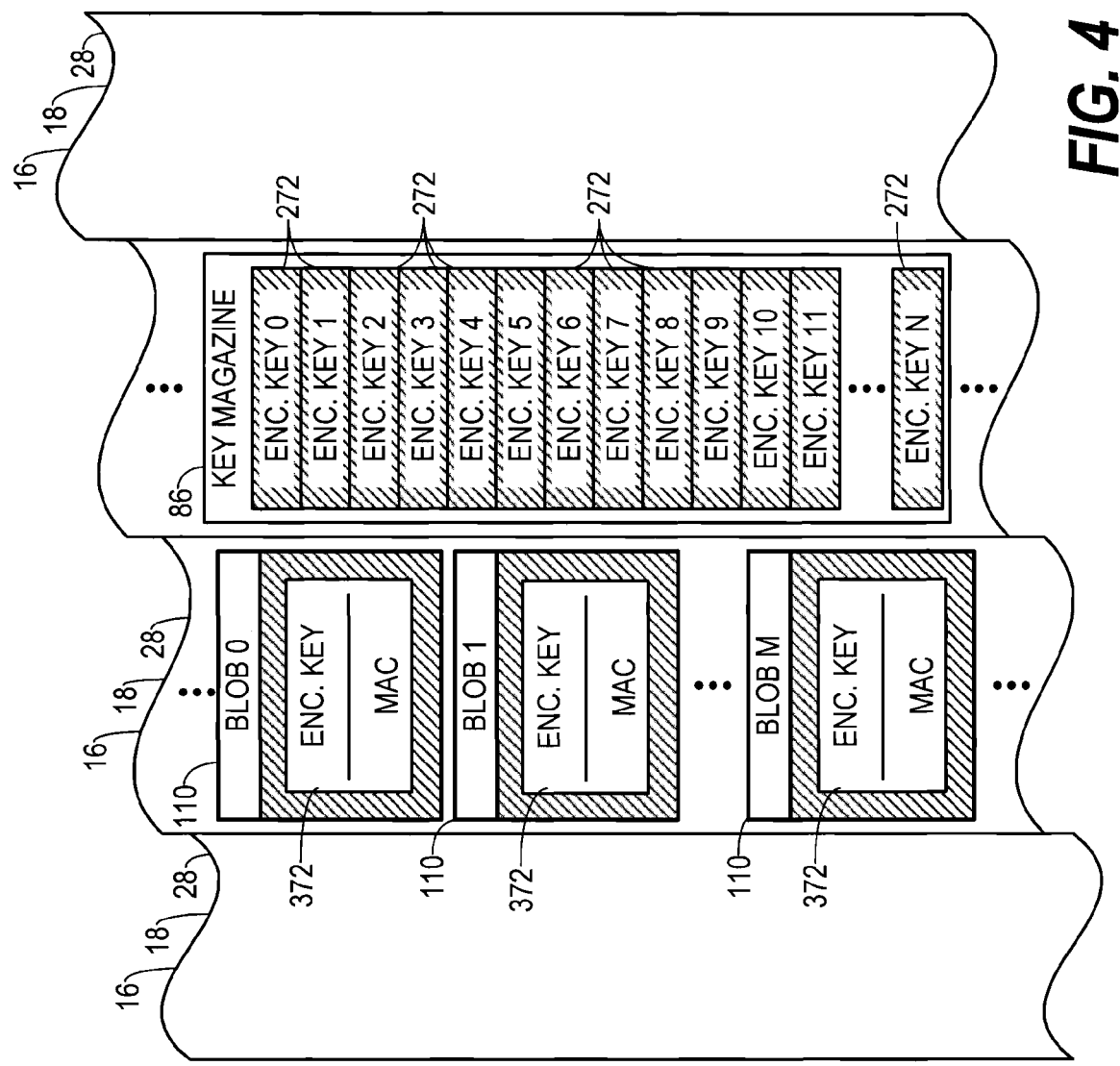
FIG. 4 shows an exemplary memory map of an unsecured memory portion of the host device.

FIG. 4 shows an exemplary memory map of a portion of unsecured memory 16, 18, and/or 28 in host device 10. In particular, FIG. 4 indicates that a key magazine 86 is stored in unsecured memory. Key magazine 86 includes N+1 distinct encryption keys. In particular, key magazine 86 desirably stores ciphertext keys 272. Since key magazine 86 resides in unsecured memory, which is easily and inexpensively included in host device 10, a multiplicity of ciphertext keys 272 may be stored in key magazine 86, making key magazine 86 a high-capacity key magazine. That multiplicity of ciphertext active keys 272 may number in the tens or hundreds of thousands or more when called for by the application, but the multiplicity of ciphertext active keys 272 stored in key magazine 86 may be a smaller number in other applications.

Referring to FIGS. 3 and 4, reset process 78 also performs a task 88 to set an index number (N) which indicates the number of ciphertext keys 272 stored in a key magazine 86 to zero. As discussed below, the generation of a new plaintext reset epoch key 154 in process 78 effectively destroys any ciphertext keys 272 that may be in key magazine 86. Thus, ciphertext keys 272 are referred to herein as short-lived ciphertext keys because they are not intended to be used beyond a reset epoch for host device 10, where a reset epoch represents the duration between successive activations of reset signal 44. Such ciphertext keys 272 were encrypted using an old plaintext reset epoch key 154, which has now been destroyed as a result of reset process 78. The old plaintext reset epoch key 154 may have also been separately and previously destroyed in response to a power off or tamper event, as discussed above in connection with FIG. 2.

By resetting the index number N to zero, software which manages ciphertext keys 272 may quickly determine that no valid ciphertext keys 272 reside in key magazine 86. But even if the index number N is somehow prevented from being reset to zero in task 88, any cryptographic use of a short-lived ciphertext key 272 not based upon the new plaintext reset epoch key 154 will be unsuccessful.

Following task 88, program control exits from reset process 78. But reset process 78 is desirably executed again when another reset occurs.

Figure 5:
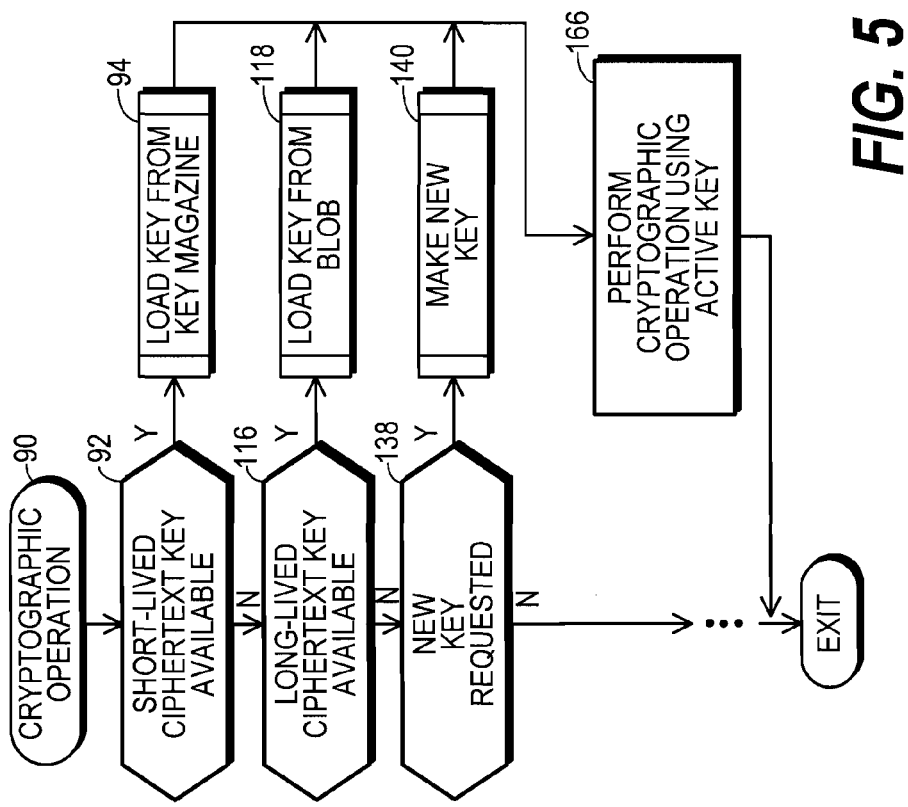
FIG. 5 shows a flow chart of an exemplary cryptographic operation process performed in the secure processing system depicted in FIG. 1.

FIG. 5 shows a flow chart of an exemplary cryptographic operation process 90 performed in secure processing system 12. Process 90 may be performed by controller 46 in response to the execution of software programming instructions using components of secure processing section 30, and possibly other components of host device 10. In particular, process 90 may be invoked when a request is made within host device 10 for some sort of cryptographic operation with respect to some data object.

Process 90 includes a query task 92 which determines whether a short-lived ciphertext key 272 already exists for use in connection with the specified data object. For example, if a data object has been encrypted using a particular plaintext active key 172, then that plaintext active key 172 should have been encrypted into a short-lived ciphertext key 272 and saved in key magazine 86. In order to decrypt the data object, the same plaintext active key 172 should be recovered. When task 92 determines that a particular short-lived ciphertext key 272 is available for use in connection with some cryptographic operation, a load key from key magazine process 94 is performed.

Figure 6:
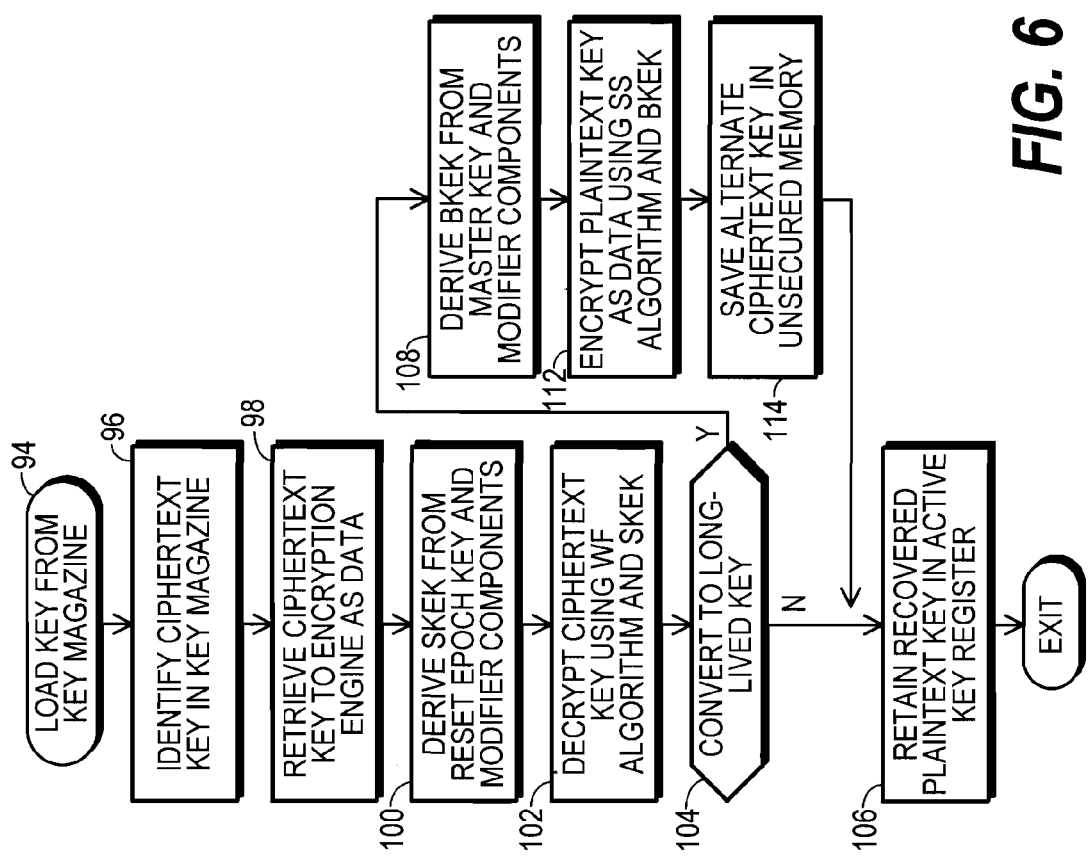
FIG. 6 shows a flow chart of an exemplary load key from key magazine process performed in the secure processing system depicted in FIG. 1.

FIG. 6 shows a flow chart of an exemplary load key from key magazine process 94 performed in secure processing system 12. Process 94 may be performed by controller 46 in response to the execution of software programming instructions using components of secure processing section 30, and possibly other components of host device 10. In particular, process 94 may be invoked to recover a plaintext active key 172 which no longer exists within host device 10 but which has an encrypted short-lived ciphertext key 272 counterpart in key magazine 86.

Referring to FIGS. 2 and 6, process 94 performs a task 96 to identify the specific one of the multiplicity of short-lived ciphertext keys 272 stored in key magazine 86 that will be used in an upcoming cryptographic operation. Then, a task 98 retrieves the identified short-lived ciphertext key 272 from key magazine 86 in unsecured memory to encryption engine 66, where it is saved in data register 76. After task 98, in one embodiment a task 100 derives a session key encryption key (SKEK) from plaintext reset epoch key 154 and modifier components from key modifier components section 64, possibly with hashing. In another embodiment, plaintext reset epoch key 154 more directly serves as the SKEK without combining with modifier components and/or performing a hashing algorithm in task 100. In either embodiment, task 100 moves the SKEK to active key register 72. Following task 100, a task 102 causes encryption processor 66' to decrypt short-lived ciphertext key 272 using decryption process 68'' of WF algorithm 68 and the SKEK as a cryptographic key. Task 102 forms a recovered plaintext active key 172 which may be moved to active key register 72 or otherwise saved within secure processing section 30 for subsequent use.

Following task 102, a query task 104 inquires whether to convert the short-lived ciphertext key 272 retrieved above in task 98 into a long-lived ciphertext key. When no such conversion is needed, a task 106 is performed to retain the recovered plaintext active key 172 in active key register 72 for use in connection with an upcoming cryptographic operation. After task 106, program control for process 94 exits and returns to cryptographic operation process 90 to perform such a cryptographic operation. But process 94 may be repeated for each cryptographic operation having a ciphertext key 272 in key magazine 86.

A conversion from a short-lived ciphertext key into a long-lived ciphertext key may be desirable on occasion to impart permanence to the key. For example, an application may require certain data objects to be recoverable after activation of reset signal 44, after a tamper event, or after a power off event. In these situations and others, a task 108 is performed after query task 104. Task 108 derives a blob key encryption key (BKEK) from plaintext master key 160 and modifier components from key modifier components section 64, possibly with hashing.

A number (M+1) of blobs 110 are depicted in FIG. 4. In this embodiment, a blob 110 is a binary, large, encrypted, object stored in unsecured memory 16, 18, and/or 28. Each blob 110 is a self-contained object which includes a cryptographic key in an encrypted form and a message authentication code (MAC). In contrast with ciphertext keys 272 stored in key magazine 86, blobs 110 are desirably encrypted using a stronger cryptographic algorithm, such as SS algorithm 70. The BKEK derived in task 108 is a cryptographic key to be used in forming a blob 110. In another embodiment, plaintext master key 160 directly serves as the BKEK without combining with modifier components and/or performing a hashing algorithm in task 108. In either embodiment, task 108 moves the BKEK to active key register 72.

After task 108, a task 112 moves the plaintext active key 172 recovered in task 102 to data register 76 and encrypts this key 172 using encryption process 70' of SS algorithm 70 and the BKEK. Encryption process 70' may involve multiple passes, with a first pass performing a weaker encryption algorithm on the plaintext active key 172 using the BKEK and a subsequent pass forming a MAC tag over this encrypted key and any other data that may be included in the blob 110. Task 112 forms an alternate ciphertext key 372, with alternate ciphertext key 372 being a long-lived alternate to the short-lived ciphertext key 272 retrieved above in task 98. Then a task 114 stores long-lived alternate ciphertext key 372 in unsecured memory as part of a blob 110. Additional data may or may not be included in the blob 110. Following task 114, program control flows to task 106, and then exits process 94 with recovered plaintext active key 172 in active key register 72.

Referring back to FIG. 5, when query task 92 determines that no short-lived ciphertext key 272 is available in key magazine 86 suitable for a specific upcoming cryptographic operation, a query task 116 determines whether a long-lived alternate ciphertext key 372 may be available. As discussed above, on occasion a cryptographic key may be converted into a long-lived alternate ciphertext key 372 to impart permanence to the key, and on occasion a tamper, power off, or reset event may occur which effectively destroys short-lived ciphertext keys 272 by destroying the plaintext reset epoch key 154 upon which they are based. Thus, after a reset a long-lived alternate ciphertext key 372 may be available for use in a specific cryptographic operation. When task 116 determines that a particular long-lived alternate ciphertext key 372 is available for use in connection with some cryptographic operation, a load key from blob process 118 is performed.

Figure 7:
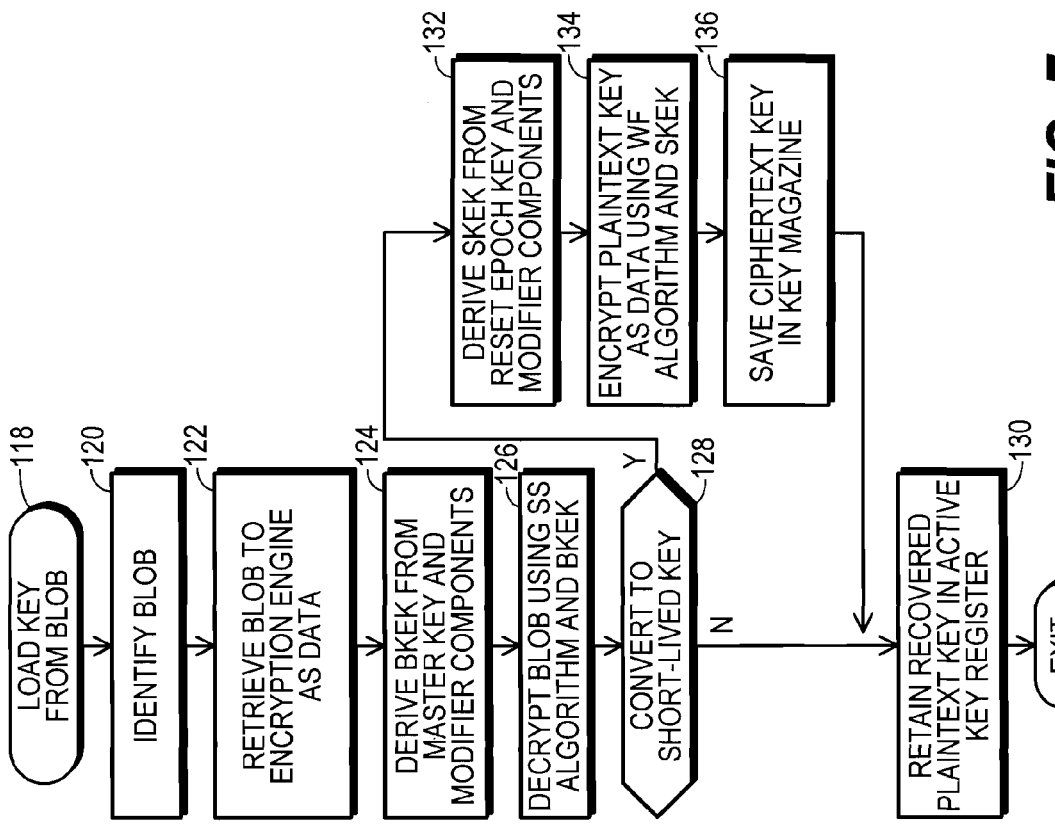
FIG. 7 shows a flow chart of an exemplary load key from blob process performed in the secure processing system depicted in FIG. 1.

FIG. 7 shows a flow chart of an exemplary load key from blob process 118 performed in secure processing system 12. Process 118 may be performed by controller 46 in response to the execution of software programming instructions using components of secure processing section 30, and possibly other components of host device 10. In particular, process 118 may be invoked to recover a plaintext active key 172 which no longer exists within host device 10 but which has an encrypted long-lived alternate ciphertext key 372 counterpart in a blob 110 stored in unsecured memory 16, 18, or 28.

Referring to FIGS. 2, 4 and 7, process 118 performs a task 120 to identify the specific one of the various blobs 110 stored in unsecured memory which included the sought-after, long-lived alternate ciphertext key 372. Then, a task 122 retrieves the identified blob 110 from unsecured memory to encryption engine 66, where it is saved in data register 76. After task 122, in one embodiment a task 124 derives the BKEK from plaintext master key 160 and modifier components from key modifier components section 64, possibly with hashing. In another embodiment, plaintext master key 160 more directly serves as the BKEK without combining with modifier components and/or performing a hashing algorithm in task 124. In either embodiment, task 124 moves the BKEK to active key register 72. Following task 124, a task 126 causes encryption processor 66' to decrypt the blob 110 using decryption process 70'' of SS algorithm 70 and the BKEK as a cryptographic key. Task 126 forms a recovered plaintext active key 172 from the long-lived alternate ciphertext key 372 portion of the blob 110, which may be moved to active key register 72 or otherwise saved within secure processing section 30 for subsequent use.

Following task 126, a query task 128 inquires whether to convert the long-lived alternate ciphertext key 372 retrieved above in task 122 into a short-lived ciphertext key 272. When no such conversion is needed, a task 130 is performed to retain the recovered plaintext active key 172 in active key register 72 for use in connection with an upcoming cryptographic operation. After task 130, program control for process 118 exits and returns to cryptographic operation process 90 to perform such a cryptographic operation. But process 118 may be repeated for future cryptographic operations having a long-lived alternate ciphertext key 372 stored in blobs 110 in unsecured memory.

A conversion from a long-lived alternate ciphertext key 372 into a short-lived ciphertext key 272 may be desirable to improve performance. For example, an application may be embarking on a process that will require repeated decryptions of a ciphertext key in order to perform specified cryptographic operations. In this situation, substantial performance improvements may be achieved by caching the long-lived alternate ciphertext key 372 as a short-lived ciphertext key 272 because the short-lived ciphertext key 272 can be decrypted using a faster decryption algorithm, as discussed above in connection with FIG. 6. Any loss of algorithmic strength which results from using WF algorithm 68 will be compensated, at least in part, by the non-algorithmic strength of using a short-lived key with the WF algorithm. In these situations and others, a task 132 is performed after query task 128.

In one embodiment, task 132 derives the SKEK from plaintext reset epoch key 154 and modifier components from key modifier components section 64, possibly with hashing. In another embodiment, plaintext reset epoch key 154 more directly serves as the SKEK without combining with modifier components and/or performing a hashing algorithm in task 132. In either embodiment, task 132 moves the plaintext active key 172 recovered above in task 126 to data register 76 and moves the SKEK to active key register 72. Following task 132, a task 134 causes encryption processor 66' to encrypt plaintext active key 172 using encryption process 68' of WF algorithm 68 and the SKEK as a cryptographic key. Task 134 forms a short-lived ciphertext key 272 which is saved in key magazine 86 in a task 136. After task 136, program flow passes to task 130 to retain plaintext active key 172 in active key register 72 and exit process 118 to perform the upcoming cryptographic operation. Accordingly, process 118 configures controller 46 and encryption processor 66' to convert long-lived ciphertext key 372 into short-lived ciphertext key 272.

Referring back to FIG. 5, when query task 116 determines that no long-lived alternate ciphertext key 372 suitable for a specific upcoming cryptographic operation is available, a query task 138 determines whether the formation of a new cryptographic key is being requested. A new key may be needed, for example, for a first encryption operation taking place for a new client. Or a new key may be needed for any cryptographic operation following a reset event where no long-lived alternate ciphertext key 372 is available. When task 138 determines that a particular new cryptographic key is needed, make new key process 140 is performed.

Figure 8:
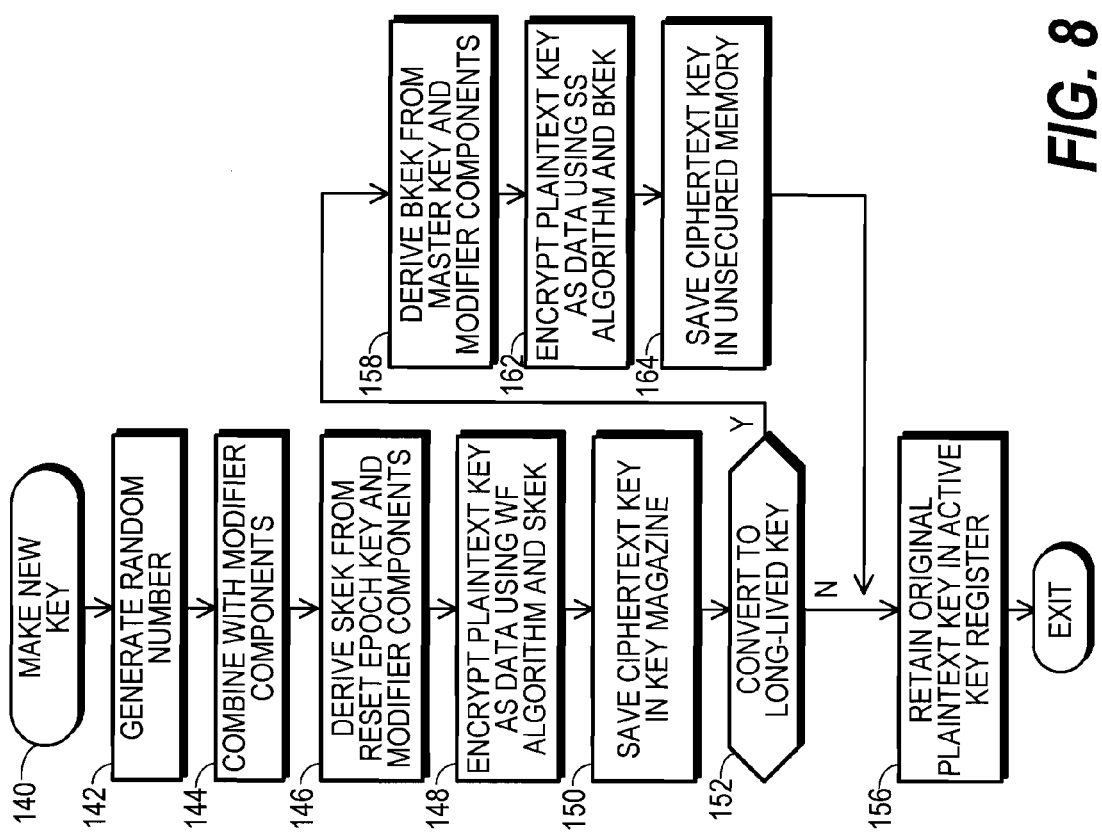
FIG. 8 shows a flow chart of an exemplary make new key process performed in the secure processing system depicted in FIG. 1.

FIG. 8 shows a flow chart of an exemplary make new key process 140 performed in secure processing system 12. Process 140 may be performed by controller 46 in response to the execution of software programming instructions using components of secure processing section 30, and possibly other components of host device 10. In particular, process 140 may be invoked every time a new cryptographic key is generated. As discussed above, high-capacity key magazine 86 may store a multiplicity of short-lived ciphertext keys 272, with each of keys 272 being generated as a result of a single invocation of process 140.

Referring to FIGS. 2 and 8, in one embodiment process 140 performs a task 142, which causes a random number to be generated using random number generator 62. Then, in one embodiment the random number generated in task 142 is combined with key modifier components from section 64 in a task 144, and possibly arithmetically manipulated further by hashing or the like, to form a suitable plaintext active key 172. In another embodiment, the random number generated in task 142 more directly serves as plaintext active key 172 without performing task 144. In still other embodiments, keys may be generated using any of a number of protocols known to those skilled in the art, including IKE, DH, RSA key gen., SSL, random key, and the like. In each of such embodiments, task 144 saves plaintext active key 172 for future use and moves the plaintext active key 172 to data register 76. The plaintext active key 172 is an original plaintext active key because, to a cryptographically significant probability, it has not existed within secure processing system 12 before.

Following task 144, in one embodiment, a task 146 derives the SKEK from plaintext reset epoch key 154 and modifier components from key modifier components section 64, possibly with hashing. In another embodiment, plaintext reset epoch key 154 more directly serves as the SKEK without combining with modifier components and/or performing a hashing algorithm in task 144. In either embodiment, task 144 moves the original plaintext active key 172 generated above in task 144 to data register 76 and moves the SKEK to active key register 72. Following task 146, a task 148 causes encryption processor 66' to encrypt the original plaintext active key 172 using encryption process 68' of WF algorithm 68 and the SKEK as a cryptographic key. Task 148 forms a short-lived ciphertext key 272 which is stored in key magazine 86 in a task 150. It is task 150, performed a multiplicity of times by a multiplicity of invocations of process 140, that forms a multiplicity of new keys for storage in high-capacity key magazine 86 (FIG. 4).

Following task 150, a query task 152 inquires whether to convert the short-lived ciphertext key 272 generated above in task 148 into a long-lived ciphertext key 372. When no such conversion is needed, a task 156 is performed to retain the original plaintext active key 172 from task 144 in active key register 72 for use in connection with an upcoming cryptographic operation. After task 156, program control for process 140 exits and returns to cryptographic operation process 90 to perform such a cryptographic operation. But process 140 may be repeated for each new cryptographic key generated for host device 10.

A conversion from a short-lived ciphertext key into a long-lived ciphertext key may be desirable on occasion to impart permanence to the key. In these situations and others, a task 158 is performed after query task 152. In one embodiment, task 158 derives the BKEK from plaintext master key 160 and modifier components from key modifier components section 64, possibly with hashing. In another embodiment, plaintext master key 160 more directly serves as the BKEK without combining with modifier components and/or performing a hashing algorithm in task 158. In either embodiment, task 158 moves the BKEK to active key register 72.

After task 158, a task 162 moves the plaintext active key 172 generated above in task 144 to data register 76 and encrypts this key 172 using encryption process 70' of SS algorithm 70 and the BKEK. Task 162 forms a long-lived alternate ciphertext key 372. Then a task 164 stores long-lived alternate ciphertext key 372 in unsecured memory 16, 18, and/or 28 (FIG. 1) as part of a blob 110 (FIG. 4). Additional data may or may not be included in the blob 110. Accordingly, through tasks 152, 158, 162, and 164 controller 46 and encryption processor 66' are configured to form long-lived alternate ciphertext key 372 using SS algorithm 70 and plaintext master key 160. Following task 164, program control flows to task 156, and then exits process 140 with original plaintext active key 172 in active key register 72.

By repeating process 140 a multiplicity of times, a multiplicity of plaintext active keys 172 are formed by task 144, and a corresponding multiplicity of short-lived active ciphertext keys 272 are formed by task 148 and stored in high-capacity key magazine 86 in task 150. Moreover, a portion of the multiplicity of keys 172 and 272 may be converted into long-lived alternate ciphertext keys 372 through tasks 152, 158, 162, and 164. Short-lived ciphertext keys 272 are encrypted using WF algorithm 68 and plaintext reset epoch key 154 while long-lived alternate ciphertext keys 372 are encrypted using SS algorithm 70 and plaintext master key 160.

Referring back to FIG. 5, when query task 138 determines that no new key is being requested, a variety of other tasks may be performed, as indicated by ellipses. For example, any of a variety of other cryptographic operations that do not require keys, such as hashing, may be performed. Or, if the operation requires a key but no key is available, then an error handling task may be performed. Eventually, such tasks complete and program flow exits from process 90.

After any of the above-discussed processes 94, 118, and 140 completes, program flow proceeds to task 166, which performs the requested cryptographic operation. Any of a variety of different cryptographic operations may be performed at task 166, and the plaintext active key 172 to be used with the operation will be in active key register 72 as a result of performing processes 94, 118, or 140. The cryptographic operation is desirably carried out in secure processing section 30 on a data object using the plaintext active key 172 as the encryption or decryption key. When the plaintext active key 172 is decrypted from a short-lived ciphertext key 272, a particularly fast decryption is used so that this decryption operation may be conducted on-the-fly while host device 10 is processing its payload data. Following task 166 program flow exits process 90. But process 90 may be repeated again numerous times to request the performance of a succession of cryptographic operations.

In summary, at least one embodiment of the present invention provides an improved encryption apparatus which is compatible with the use of a high-capacity key magazine stored in unsecured memory. In at least one embodiment of the present invention a short-lived plaintext secret key is generated for use during the limited duration of a reset epoch and used with a high performance cryptographic algorithm to encrypt keys stored in the high-capacity key magazine portion of unsecured memory. In at least one embodiment of the present invention, the high performance cryptographic algorithm is used to recover, on-the-fly, plaintext keys from ciphertext keys stored in the high-capacity key magazine for use in cryptographic operations on the host device's payload data. In at least one embodiment of the present invention a long-lived plaintext secret key is generated for use over many reset epochs and used with a strong cryptographic algorithm to encrypt keys stored in unsecured memory. In at least one embodiment of the present invention keys encrypted using the strong cryptographic algorithm may be converted into keys encrypted with the high performance cryptographic algorithm to achieve performance improvements. And, in at least one embodiment of the present invention, keys encrypted using the high performance cryptographic algorithm may be converted into keys encrypted using the strong cryptographic algorithm to achieve a longer key life.

Although the preferred embodiments of the invention have been illustrated and described in detail, it will be readily apparent to those skilled in the art that various modifications may be made therein without departing from the spirit of the invention or from the scope of the appended claims.

What is claimed is:

1. An encryption apparatus having a reset port at which a reset signal is applied, said apparatus comprising:
   a memory for storing a first ciphertext key;
   a first key register, configured as a volatile register, for storing a first plaintext key;
   a second key register for storing a second plaintext key;
   a third key register, configured as a non-volatile register, for storing a third plaintext key;
   an encryption processor coupled to said first, second, and third key registers;
   a random number generator coupled to said first key register; and
   a controller coupled to said random number generator, said memory, and said encryption processor, said encryption processor and said controller being configured to cause said first plaintext key to be formed using said random number generator and stored in said first key register in response to activation of said reset signal, configured to cause said second plaintext key to be generated by said encryption processor from said first ciphertext key using said first plaintext key and to be stored in said second key register, configured to apply first and second cryptographic algorithms, wherein said first cryptographic algorithm requires more processing time than said second cryptographic algorithm, said first cryptographic algorithm being applied using said third plaintext key, and said second cryptographic algorithm being applied using said first plaintext key, and configured to convert said first ciphertext key into a second ciphertext key using said second then said first cryptographic algorithms to allow said second plaintext key to be recoverable after said activation of said reset signal.

2. An encryption apparatus as claimed in claim 1 wherein said second cryptographic algorithm and said first plaintext key are applied to said first ciphertext key to generate said second plaintext key.

3. An encryption apparatus as claimed in claim 1 wherein said second cryptographic algorithm includes an encryption process and a decryption process which is complimentary to said encryption process, said decryption process being configured to execute in the same or less processing time than said encryption process.

4. An encryption apparatus having a reset port at which a reset signal is applied, said apparatus comprising:
- a memory for storing a first ciphertext key;
- a first key register, configured as a volatile register, for storing a first plaintext key;
- a second key register for storing a second plaintext key;
- a third key register, configured as a non-volatile register, for storing a third plaintext key;
- an encryption processor coupled to said first and second key registers;
- a random number generator coupled to said first key register; and
- a controller coupled to said random number generator, said memory, and said encryption processor, said encryption processor and said controller being configured to cause said first plaintext key to be formed using said random number generator and stored in said first key register in response to activation of said reset signal, configured to cause said second plaintext key to be generated by said encryption processor from said first ciphertext key using said first plaintext key and to be stored in said second key register, configured to apply first and second cryptographic algorithms, wherein said first cryptographic algorithm requires more processing time than said second cryptographic algorithm, said first cryptographic algorithm being applied using said third plaintext key, and said second cryptographic algorithm being applied using said first plaintext key, configured to form a second ciphertext key using said first cryptographic algorithm, and configured to convert said first ciphertext key into said second plaintext key using said second cryptographic algorithm.

5. An encryption apparatus as claimed in claim 1 additionally comprising a tamper detection circuit coupled to said first key register and configured to destroy said first plaintext key upon the detection of a tamper event.

6. An encryption apparatus as claimed in claim 1 wherein:
- said first key register, said second key register, said random number generator, and said controller reside within an integrated circuit; and
- said memory resides outside said integrated circuit.

7. An encryption apparatus as claimed in claim 1 wherein:
- said first key register, said second key register, said encryption processor, and said random number generator are located in a secure processing section of said encryption apparatus; and
- said memory resides outside said secure processing section.

8. An encryption apparatus as claimed in claim 1 wherein said controller is further configured to:
- generate, after said first plaintext key is stored in said first key register, an original second plaintext key;
- encrypt said original second plaintext key using said first plaintext key to form said first ciphertext key; and
- store said first ciphertext key in said memory.

9. An encryption apparatus as claimed in claim 1 wherein said first key register is configured so that said first plaintext key is destroyed in response to a power-off event.

10. An encryption apparatus as claimed in claim 1 wherein said first key register is configured so that said first plaintext key is destroyed in response to a reset event.

11. An encryption apparatus as claimed in claim 1 wherein said first key register is configured so that said first plaintext key is destroyed in response one of a power-off event, a reset event, and a temper event.

12. An encryption apparatus having a reset port at which a reset signal is applied, said apparatus comprising:
- a memory for storing a ciphertext key;
- a first key register, configured as a volatile register, for storing a first plaintext key;
- a second key register for storing a second plaintext key;
- a third key register, configured as a non-volatile register, for storing a third plaintext key;
- an encryption processor coupled to said first and second key registers;
- a random number generator coupled to said first key register; and
- a controller coupled to said random number generator, said memory, and said encryption processor, said encryption processor and said controller being configured to cause said first plaintext key to be formed using said random number generator and stored in said first key register in response to activation of said reset signal, configured to cause said second plaintext key to be generated by said encryption processor from said ciphertext key using said first plaintext key and to be stored in said second key register, configured to apply first and second cryptographic algorithms, wherein said first cryptographic algorithm requires more processing time than said second cryptographic algorithm, said first cryptographic algorithm being applied using said third plaintext key, and said second cryptographic algorithm being applied using said first plaintext key, configured to encrypt said second plaintext key using said first cryptographic algorithm and said third plaintext key to form an alternate ciphertext key, and configured to store said alternate ciphertext key in said memory to allow said second plaintext key to be recoverable after a reset.

13. An encryption apparatus having a reset port at which a reset signal is applied, said apparatus comprising:
- a memory for storing a first ciphertext key;
- a first key register, configured as a volatile register, for storing a first plaintext key;
- a second key register for storing a second plaintext key;
- a third key register, configured as a non-volatile register, for storing a third plaintext key;
- an encryption processor coupled to said first and second key registers;
- a random number generator coupled to said first key register; and
- a controller coupled to said random number generator, said memory, and said encryption processor, said encryption processor and said controller being configured to cause said first plaintext key to be formed using said random number generator and stored in said first key register in response to activation of said reset signal, configured to cause said second plaintext key to be generated by said encryption processor from said first ciphertext key using said first plaintext key and to be stored in said second key register, configured to apply first and second cryptographic algorithms, wherein said first cryptographic algorithm requires more processing time than said second cryptographic algorithm, said first cryptographic algorithm being applied using said third plaintext key, and said second cryptographic algorithm being applied using said first plaintext key, configured to generate, before said first plaintext key is stored in said first key register, an original second plaintext key, configured to encrypt said original second plaintext key using said first cryptographic algorithm and said third plaintext key to form an alternate ciphertext key, configured to store said alternate ciphertext key in said memory, and configured to convert, after said first plaintext key is stored in said first key register, said alternate ciphertext key into said second ciphertext key using said first cryptographic algorithm and said third plaintext key then said second cryptographic algorithm and said first plaintext key.

14. An encryption apparatus as claimed in claim 12 wherein said second cryptographic algorithm is also applied to said ciphertext key.

15. An encryption apparatus as claimed in claim 1 wherein said first ciphertext key is one of a multiplicity of ciphertext keys stored in a key magazine formed in said memory.

16. An encryption apparatus as claimed in claim 4 wherein said first key register is configured so that said first plaintext key is destroyed in response one of a power-off event, a reset event, and a temper event.

17. An encryption apparatus as claimed in claim 13 wherein said second cryptographic algorithm and said first plaintext key are applied to said first ciphertext key to generate said second plaintext key.

18. An encryption apparatus as claimed in claim 12 wherein said second cryptographic algorithm and said first plaintext key are applied to said ciphertext key to generate said second plaintext key.

19. An encryption apparatus as claimed in claim 12 wherein said first key register is configured so that said first plaintext key is destroyed in response one of a power-off event, a reset event, and a temper event.

* * * * *